US007903693B2

(12) United States Patent
Girerd et al.

(10) Patent No.: US 7,903,693 B2
(45) Date of Patent: Mar. 8, 2011

(54) INSTALLATION OF INTELLIGENT SENSORS FOR THE HIGH-SPEED ACQUISITION OF DATA VIA AN ETHERNET NETWORK

(75) Inventors: Claude Girerd, Tassin la demi Lune (FR); Stavros Katsanevas, Paris (FR); Cyrille Guerin, Vaugneray (FR); Jacques Marteau, Tignieu (FR); Remi Barbier, Lyons (FR); Dominique Sappey-Marinier, Rillieux (FR)

(73) Assignee: Universite Claude Bernard Lyon I, Villeurbanne Cedex (FR)

( * ) Notice: Subject to any disclaimer, the term of this patent is extended or adjusted under 35 U.S.C. 154(b) by 1094 days.

(21) Appl. No.: 10/586,467

(22) PCT Filed: Jan. 20, 2005

(86) PCT No.: PCT/FR2005/000120
§ 371 (c)(1),
(2), (4) Date: Jan. 9, 2007

(87) PCT Pub. No.: WO2005/081121
PCT Pub. Date: Sep. 1, 2005

(65) Prior Publication Data
US 2008/0225861 A1    Sep. 18, 2008

(30) Foreign Application Priority Data
Jan. 20, 2004    (FR) .................................... 04 00468

(51) Int. Cl.
*H04J 3/06*        (2006.01)
(52) U.S. Cl. ........................................ 370/503; 709/224
(58) Field of Classification Search .......... 370/241–252, 370/503; 709/224
See application file for complete search history.

(56) References Cited

U.S. PATENT DOCUMENTS

| 6,370,159 | B1* | 4/2002 | Eidson ........................... 370/503 |
| 6,826,590 | B1 | 11/2004 | Glanzer et al. |
| 7,401,159 | B1* | 7/2008 | Aviani et al. ................... 709/238 |
| 2003/0036875 | A1 | 2/2003 | Peck et al. |
| 2003/0055900 | A1 | 3/2003 | Glas et al. |
| 2006/0088121 | A1* | 4/2006 | Feher ............................. 375/271 |

OTHER PUBLICATIONS

Potter et al, "Using Ethernet for Industrial I/O and Data Acquisition," Proceedings of 16th IEEE Instrumentation and Measurement Tech. Conf., vol. 3, pp. 1492-1496, May 1999.

* cited by examiner

*Primary Examiner* — Ricky Ngo
*Assistant Examiner* — Kan Yuen
(74) *Attorney, Agent, or Firm* — Dennison, Schultz & MacDonald

(57) ABSTRACT

The invention concerns an installation for the high-speed acquisition of acquisition data via an Ethernet network (2) with several nodes (N), where at least one of the nodes of the Ethernet network constitutes a client/server detection unit (3) with at least one detector (4) delivering acquisition data.
According to the invention each detection unit (3) includes:
self-triggering resources for reading the acquisition data so that the said detection unit (3) is able to operate independently,
reading and processing resources that are independent of the other nodes,
resources for transmission of the acquisition data via the network (2), to at least one other node (N).
and a clock unit allowing correlation between the clocks of the detection units, where each clock unit has resources for receiving a clock synchronisation signal, resources for transmission to the transmitting clock unit, and resources for processing the encoded instructions.

9 Claims, 1 Drawing Sheet

1

INSTALLATION OF INTELLIGENT SENSORS FOR THE HIGH-SPEED ACQUISITION OF DATA VIA AN ETHERNET NETWORK

This application is a filing under 35 USC 371 of PCT/FR2005/000120, filed Jan. 20, 2005.

BACKGROUND OF THE INVENTION

This present invention concerns the technical area of the high-speed transmission of acquisition data over an Ethernet network.

More precisely, the subject of the invention concerns one and preferably several sensors of the intelligent type, each incorporated into the Ethernet network as a single node.

In many applications, the need arises to remotely transmit measurement data acquired by one or more sensors located at distant sites. Thus, we are familiar, for example, from document US2003-0036875, with a computer network for communication between several computers. At least one of the computers, known as the master, is connected by a bus to a series of sensors for the measurement of diverse physical magnitudes. Such an architecture is used to remotely transmit configuration data from the measurement sensors, via a special communication bus, between the computer and the measurement sensors. This document does not describe a technique for acquisition of the high-speed data, which generally involves a high implementation cost, a relatively fixed measurement architecture that is difficult to develop, and a slowness in the transmission of the acquired data.

From the publication entitled: POTTER D ED, PIURI V ET AL, INSTITUTE OF ELECTRICAL AND ELECTRONICS ENGINEERS: "USING ETHERNET FOR INDUSTRIAL I/O AND DATA ACQUISITION", IMTC/99 PROCEEDINGS OF THE 16TH IEEE INSTRUMENTATION AND MEASUREMENT TECHNOLOGY CONFERENCE, VENICE, IT, MAY 24-26, 1999, IEEE INSTRUMENTATION AND MEASUREMENT TECHNOLOGY CONFERENCE (IMTC), NEW YORK, N.Y.: IEEE, US, VOL. 3, 24 MAY 1999 (1999-05-24), PAGES 1492-1496, XP000871813, We are also familiar with the use of the Ethernet network for the acquisition of data, such as measurement data coming from sensors. However, the Ethernet network does not allow the operation of the different sensors to be correlated.

SUMMARY OF THE INVENTION

The subject of this present invention therefore aims to remedy the drawbacks mentioned above, by proposing an installation that is simple to implement, allowing the high-speed acquisition of acquisition data, effected by at least one detector. Another objective of the invention is to propose an installation that provides simplified access to the detector, as well as a simplified and correlated distribution of the acquisition data.

In order to attain such an objective, the subject of the invention concerns an installation for the high-speed acquisition of acquisition data over the Ethernet network, with several nodes, where at least one of the nodes of the Ethernet network constitutes a client/server detection unit with at least one detector delivering acquisition data, characterised in that each detection unit includes:

self-triggering resources for reading the acquisition data so that the said detection unit is able to operate independently, reading and processing resources that are independent of the other nodes, resources for transmission of the acquisition data via the network to at least one other node.

and a clock unit allowing correlation between the clocks of the 20 detection units, where each clock unit includes:

resources for receiving a clock synchronisation signal, generated by one of the said units and having encoded instructions, resources for transmission of an acknowledge signal to the clock unit transmitting the synchronisation signal, and resources for processing the encoded instructions, in particular to increment an event marking sensor.

According to one advantageous implementation characteristic, at least one of the nodes of the Ethernet network constitutes a client/server user unit designed to provide the detection unit with configuration data from the said unit and to receive acquisition data transmitted by the detection unit.

Advantageously, each detection unit includes:

a detector performing the conversion of a physical magnitude into electrical signals delivered on several output paths, a sequencer with resources performing:
  sequencing for reading the acquisition data from the detector and of the configuration data,
  storage of the acquisition and configuration data,
  analysis and processing of the acquisition data from the detector,
  the interface to a network processor, and an Ethernet network processor with resources providing:
  the interface to the sequencer,
  reception of the data sent by the user unit to perform configuration of the detector and of the sequencer,
  processing of the acquisition data,
  and transmission of the acquisition data from the detector to the user unit.

Advantageously, the sequencer includes resources performing:

formatting of the acquisition data from the detector and of the information resulting from the processing effected by the detection unit, storage in memory of the processed and formatted acquisition data, and temporal marking of the trigger for acquisition of the data.

According to a preferred implementation example, the sequencer is based upon an FPGA (field-programmable gate array device).

According to one implementation characteristic, the Ethernet network processor includes resources performing:

retrieval of the data stored in the memory by the sequencer, analysis and processing of the said data, formatting of the processed data, and shared management of the data processing with other nodes of the network.

For example, the sequencer performs the storage of the data in a memory inside or outside the sequencer.

According to a preferred implementation example, the detector includes a sensitive sensor with a series of output paths, a sub-module for reading the acquisition data, controlled by the sequencer and including a frontal electronic unit, and a control sub-module, managed by the sequencer, to configure and control the frontal electronic unit.

According to this implementation example, the frontal electronic unit includes:

resources for reading the acquisition data, resources for selection of the acquisition mode and resources for selection of the acquisition trigger source, resources for amplification and shaping of the signals and resources for receiving the configuration parameters.

Preferably, the control sub-module includes resources to control the frontal electronic unit and to control the detector.

BRIEF DESCRIPTION OF THE DRAWINGS

Various other characteristics come out of the description that follows, with reference to the appended drawings which show, by way of non-limiting examples, 15 forms of implementation of the subject of the invention.

DESCRIPTION OF THE PREFERRED EMBODIMENTS

Figure 1:
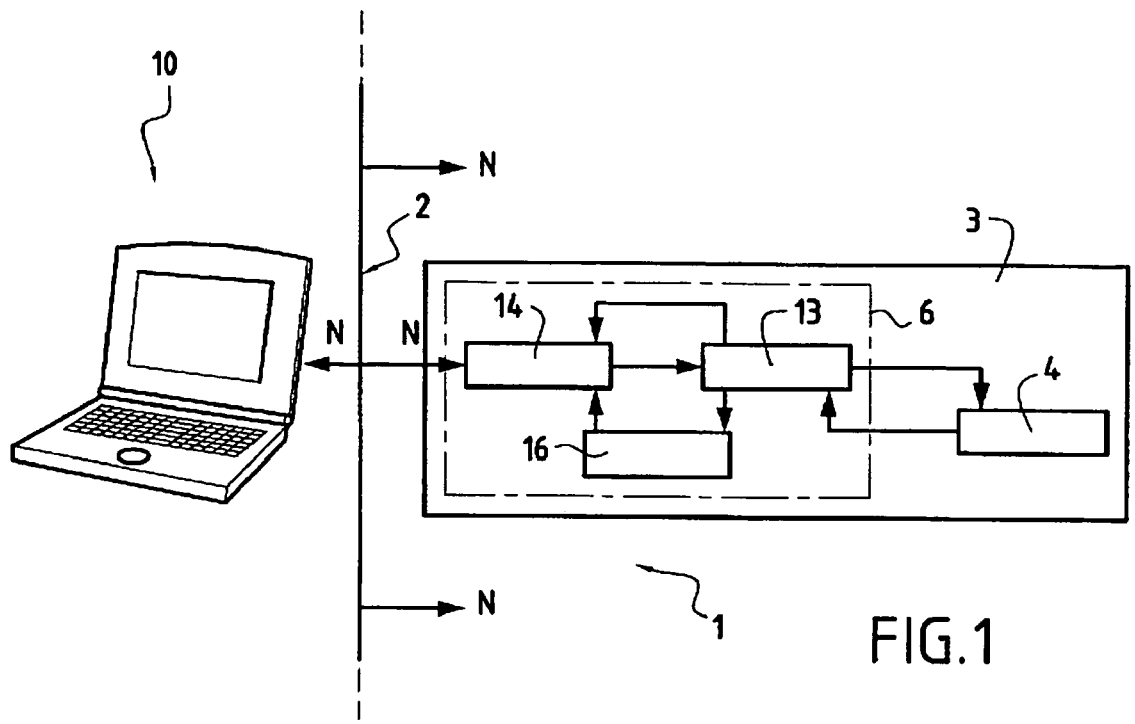
FIG. 1 is a schematic view of one implementation example of an installation according to the invention.

As demonstrated more precisely in FIG. 1, the subject of the invention concerns an installation 1 employing an Ethernet network 2 with several nodes N. According to one characteristic of the invention, at least one of the nodes N of the Ethernet network constitutes a client/server detection unit 3 with at least one detector 4 delivering acquisition data.

A detector 4 is designed to measure a physical magnitude in the general sense. In a preferred implementation example, the detector 4 is able to capture particles and to create a quantity of charge corresponding to the particle/sensitive-cell interaction. The detector 4 thus performs the conversion of a physical magnitude into electrical signals. According to a preferred implementation example, the detector 4 delivers electrical signals on several output paths, as will be explained in the remainder of the description.

Each detection unit 3 also includes an acquisition controller 6 forming the intelligent acquisition electronic part. This acquisition controller 6 receives the electrical signals from the detector 4 and has its own IP (Internet Protocol) address so that the detector 4 is connected directly to the Ethernet network via the intelligent acquisition controller 6.

According to one characteristic of the invention, the detection unit 3 includes self-triggering resources for reading the acquisition data delivered by the detector 4, so that the detection unit 3 is able to operate independently. According to another characteristic of the invention, the acquisition controller 6 includes resources for reading and processing the data, independent of the other nodes N of the Ethernet network. In other words, the acquisition controller 6 is designed to perform processing in an independent manner.

In addition, the acquisition controller 6 includes resources for transmission of the acquisition data via the Ethernet network 2 to at least one other node N. It should be noted that the acquisition controller 6 provides all of the features necessary for high-speed, multipath acquisition (pre-processing and formatting of the data, temporal marking, and transmission on the network), for operational control of the detector 4 and for processing of the data.

This acquisition controller 6 also allows the synchronisation of a detector 4 either with other detectors, or with an external clock, for the construction of a complete synchronised and distributed acquisition system, as will be described in greater detail in the remainder of the description.

The acquisition controller 6 is controlled via the Ethernet network, by a client/server user unit 10 constituting a node N of the Ethernet network 2. This user unit 10 is designed to provide the detection unit 3 with configuration data from the said unit, and to receive the acquisition data transmitted by the detection unit 3.

Figure 2:
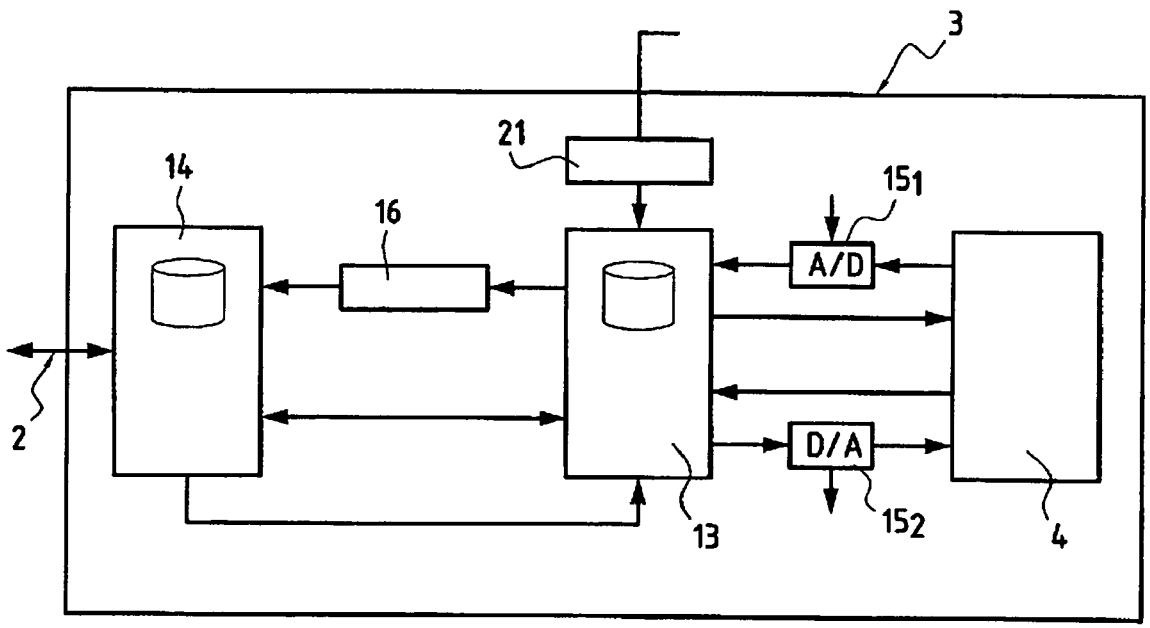
FIG. 2 is a functional diagram of a detection unit according to the invention.

As demonstrated more precisely in FIG. 2, this acquisition controller 6 includes a sequencer 13 communicating with the detector 4, and an Ethernet network processor 14 connected to the Ethernet network 2 and to the sequencer 13. The sequencer 13 is connected to the detector 4 by at least one analogue/digital converter $15_1$, and by at least one digital/analogue converter $15_2$.

According to the invention, the sequencer 13 includes resources performing the sequencing for reading the acquisition data from the detector 4, and of the configuration data transmitted by the user unit 10. The sequencer 13 includes resources that format the acquisition data from the detector 4 and the information resulting from the processing effected by the detection unit 3. The sequencer 13 also includes resources that store the processed and formatted acquisition data, as well as the configuration data. The storage of these data is effected in an internal memory 16 or, as illustrated, external to the sequencer 13 and connected to the Ethernet network processor 14.

The sequencer 13 also includes resources forming the interface to the Ethernet network processor 14. The Ethernet network processor 14 includes resources forming the interface to the sequencer 13 and resources providing for retrieval of the data stored in the memory 16 by the sequencer 13.

Advantageously, the Ethernet network processor 14 includes resources performing the analysis and processing of the retrieved data and formatting of the said data. The Ethernet network processor 14 also includes resources allowing the transmission of the acquisition data from the detector 4 to the user unit 10. The Ethernet network processor 14 also includes resources for receiving the data sent by the user unit 10, with a view to configuring the detector 4 and the sequencer 13.

The description that follows illustrates one implementation example of a client/server detection unit 3. According to this implementation example, the detector 4 is a multi-way sensor that is sensitive to photons. Such a detector 4 can be a multi-pixel photon detector, a multi-anode photo multiplier (maPMT), hybrid photodiodes (HPD) or avalanche photodiodes (APD).

The detector 4 also includes:

a sub-module for reading the acquisition data, controlled by the sequencer 13 and including a frontal electronic unit, and a control sub-module managed by the sequencer 13 to configure and control the frontal electronic unit.

The frontal electronic unit includes:

resources for amplification and shaping of the signals delivered by the detector 4 (a slow path for precision measurements and a fast path for triggering), and resources for receiving the configuration parameters from the detector 4 (such as the polarisation signals or the configuration and read registers).

The frontal electronic unit also includes:

resources for reading the multiplexed acquisition data of the slow path and analogue/digital conversion resources, resources for selection of the acquisition mode, namely calibration, test, single-channel acquisition or multi-channel acquisition, and resources for selection of the acquisition trigger source (external triggering or self-triggering).

The control sub-module, managed by the sequencer 13, is used to control:

the frontal electronic unit in performing, for example, adjustment of the polarisation voltages and currents, the control of the triggering levels for each path, and control of the calibration signals, and the detector 4, for control of the polarisation and supply voltages.

The sequencer 13 includes resources that do:

the read sequencing, allowing the reception and generation of the clock signals, generation of the read configuration registers, management of the digital inputs/outputs and management of the converters $15_1$, $15_2$, the data processing, such as removal of the zeros, the validation of events by external triggers, formatting of the data, and analysis of the data, for example, by the rapid calculation of the magnitudes associated with the data and pre-selection of the events.

According to a preferred implementation variant, the sequencer is built around an FPGA device.

According to the invention, the installation 1 allows distributed multiple acquisition via the Ethernet network 2. In this regard, each detection unit 3 includes a clock unit 21 allowing correlation between the clocks of the detection units 3 and performing temporal marking. One of the detection units 3 or the user unit 10, called the master, generates a clock synchronisation signal with encoded instructions. Each clock unit includes resources for receiving the clock synchronisation signal and resources for sending an acknowledge signal to the clock unit transmitting the synchronisation signal. Each clock unit also includes resources for processing the encoded instructions, in particular to increment an associated event-marking sensor. Such an incrementation is used to synchronise all the clocks of the different nodes of the distributed acquisition system.

The above description demonstrates that the subject of the invention allows the acquisition of measurement data exclusively via the Ethernet network, to the extent that no intermediate bus N is employed. Each of the nodes of the Ethernet network in the form of a detection unit 10 is controlled and read by an Ethernet chip installed in each detection unit visible transparently by the network.

In addition, each client/server user unit 10 controls, the detection units 3 via a direct Ethernet connection, performing, for example, configuration of the frontal electronic unit, control of the sequencing and the digitisation, as well as the processing and the transmission of the data over the Ethernet network.

Finally, each detection unit 3 includes an intelligent acquisition controller 6 with its own IP address, while still being independent in order to perform slow control, processing and reading of the acquisition data.

The architecture proposed by the invention is low in cost and is standardised by its association with the Ethernet standard, is modular terms of the design of the data acquisition scheme, and is flexible in terms of the data processing.

The invention is not limited to the examples described and illustrated, since various changes can be made to it without moving outside of its claimed coverage.

The invention claimed is:

1. An installation system for the high-speed acquisition of acquisition data including an Ethernet network with a plurality of nodes (N), where at least one of the nodes of the Ethernet network constitutes a client/server detection unit with at least one detector delivering acquisition data, said client/server detection unit comprising:

self-triggering resources for reading the acquisition data so that the client/server detection unit is able to operate independently;

reading and processing resources independent of other nodes of the network;

resources for transmission of the acquisition data via the Ethernet network to at least one other node (N);

a clock unit allowing correlation between clocks of the multiple client/server detection units;

wherein said clock unit comprises:

resources for receiving a clock synchronization signal, generated by each of the client/server detection unit and including encoded instructions;

resources for transmission of an acknowledgment signal to each of the client/server detection unit transmitting the synchronization signal; and resources for processing the encoded instructions, to increment an event-marking sensor;

a detector performing a conversion of a physical magnitude into electrical signals delivered on several output paths;

a sequencer with resources performing:

sequencing for reading the clock synchronization signal from the clock unit;

sequencing for reading the acquisition data from the detector and configuration data;

storage of the acquisition and configuration data;

analysis and processing of the acquisition data from the detector;

an interface to an Ethernet network processor, and the Ethernet network processor with resources providing:

an interface to the sequencer;

reception of the data sent by a user unit to perform the configuration of the detector and of the sequencer;

processing of the acquisition data; and transmission of the acquisition data from the detector to the user unit.

2. The installation system according to claim 1, wherein the sequencer includes resources performing:

formatting of the acquisition data from the detector and of the information resulting from the processing effected by the detection unit;

storage in a memory of the processed and formatted acquisition data, and temporal marking of a trigger for acquisition of the data.

3. The installation system according to claim 2, wherein the sequencer is built around an FPGA device.

4. The installation system according to claim 2, wherein the sequencer performs the storage of the data in memory inside or outside the sequencer.

5. The installation system according to claim 1, wherein the Ethernet network processor includes resources performing:

retrieval of the data stored in the memory by the sequencer, analysis and processing of the said data, formatting of the processed data, and shared management of the data processing with other nodes of the network.

6. The installation system according to claim 1, wherein the detector includes: a sensitive sensor with a series of output paths, a sub-module for reading the acquisition data, controlled by the sequencer and including a frontal electronic unit, and a control sub-module managed by the sequencer to configure and control the frontal electronic unit.

7. The installation system according to claim 6, wherein the frontal electronic unit of the sub-module for reading includes:

resources for reading the acquisition data, resources for selection of an acquisition mode; resources for selection of an acquisition trigger source; and resources for amplification and shaping of signals, and resources for receiving configuration parameters.

8. The installation system according to claim 6, wherein the control sub-module includes resources to control the frontal electronic unit and to control the detector.

9. The installation system according to claim 1, wherein at least one of the nodes (N) of the Ethernet network constitutes a client/server user unit designed to provide the detection unit with configuration data from the unit, and to receive acquisition data transmitted by the detection unit.

* * * * *